United States Patent [19]

Entenmann et al.

[11] Patent Number: 5,402,675
[45] Date of Patent: Apr. 4, 1995

[54] METHOD FOR RECOGNIZING THE POWER STROKE OF A FOUR-STROKE ENGINE

[75] Inventors: Robert Entenmann, Benningen; Siegfried Rohde, Oberriexingen; Bernhard Stengel, Tamm; Stefan Unland, Schwieberdingen; Matthias Philipp, Stuttgart; Oskar Torno, Schwieberdingen; Ulrich Rothhaar, Stuttgart, all of Germany

[73] Assignee: Robert Bosch GmbH, Stuttgart, Germany

[21] Appl. No.: 132,706

[22] Filed: Oct. 6, 1993

Related U.S. Application Data

[63] Continuation of Ser. No. 768,310, Sep. 26, 1991, abandoned.

[30] Foreign Application Priority Data

Jan. 26, 1990 [DE] Germany .................. 40 02 228.5

[51] Int. Cl.⁶ .......................................... G01M 15/00
[52] U.S. Cl. .................................................. 73/117.3
[58] Field of Search ................. 73/115, 116, 117.3, 73/35

[56] References Cited

U.S. PATENT DOCUMENTS

| | | | |
|---|---|---|---|
| 4,147,054 | 4/1979 | Hohenberg et al. | 73/117.3 |
| 4,424,709 | 1/1984 | Meier, Jr. et al. | 73/117.3 |
| 4,730,484 | 3/1988 | Olshefski | 73/119 R |
| 4,744,243 | 5/1988 | Tanaka | 73/117.3 |
| 4,899,711 | 2/1990 | Tabara et al. | 123/425 |

FOREIGN PATENT DOCUMENTS

| | | | |
|---|---|---|---|
| 2658614 | 7/1977 | Germany . | |
| 0155229 | 6/1989 | Japan | 73/119 R |
| 0013837 | 1/1991 | Japan | 73/116 |
| 2130760 | 6/1984 | United Kingdom | 73/116 |
| 8705971 | 8/1987 | WIPO . | |
| 9002871 | 3/1990 | WIPO . | |

OTHER PUBLICATIONS

Patent Abstracts of Japan, vol. 3, No. 158, Dec. 1979, & JP-A-54 137524 (Hino Jidosha Kogyo K.K.) Oct. 1979. "Motronic", Robert Bosch GmbH, 1993.

*Primary Examiner*—Robert Raevis
*Attorney, Agent, or Firm*—Michael J. Striker

[57] ABSTRACT

A method for recognizing a power stroke of each cylinder in a four-stroke engine calls for sensing a parameter of a cylinder in the engine for producing a signal of the parameter, the parameter being selected from the group consisting of pressure and knocking, and comparing the signal with a threshold value for determining whether the signal exceeds the threshold value and thereby is indicative of the cylinder being in a corresponding combustion stroke. In addition to sensing the pressure and knocking of the cylinder, sensing of sound signals from the cylinder is also employed in order to determine power and intake strokes of the cylinders.

6 Claims, 4 Drawing Sheets

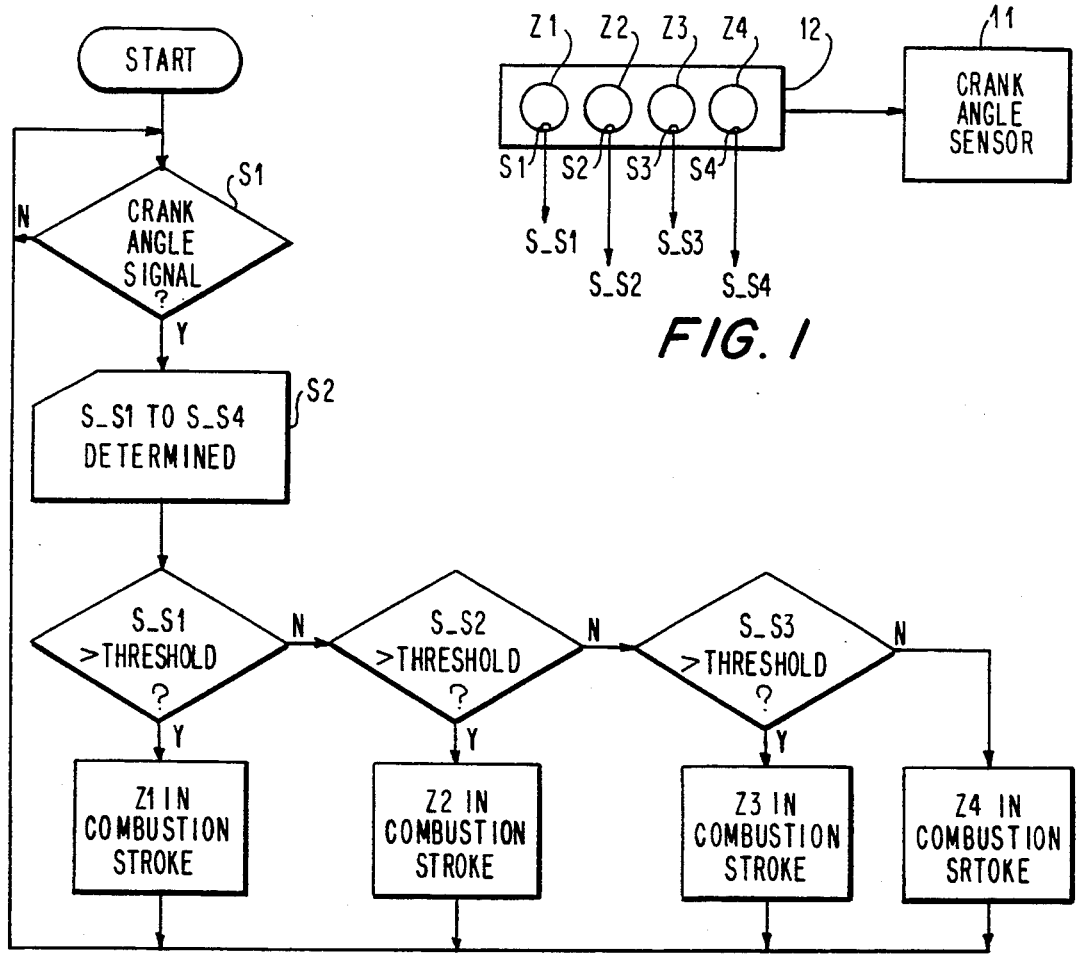
FIG. 1
FIG. 2
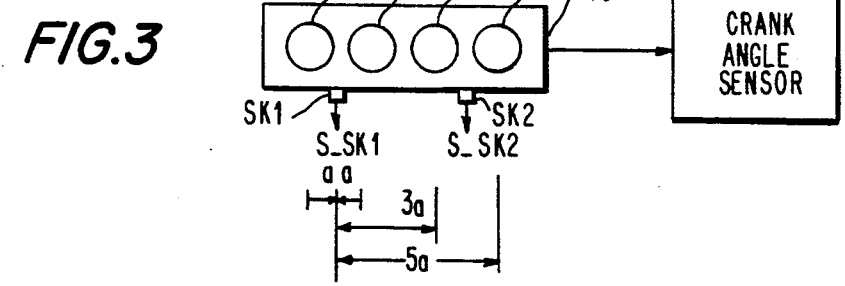
FIG. 3

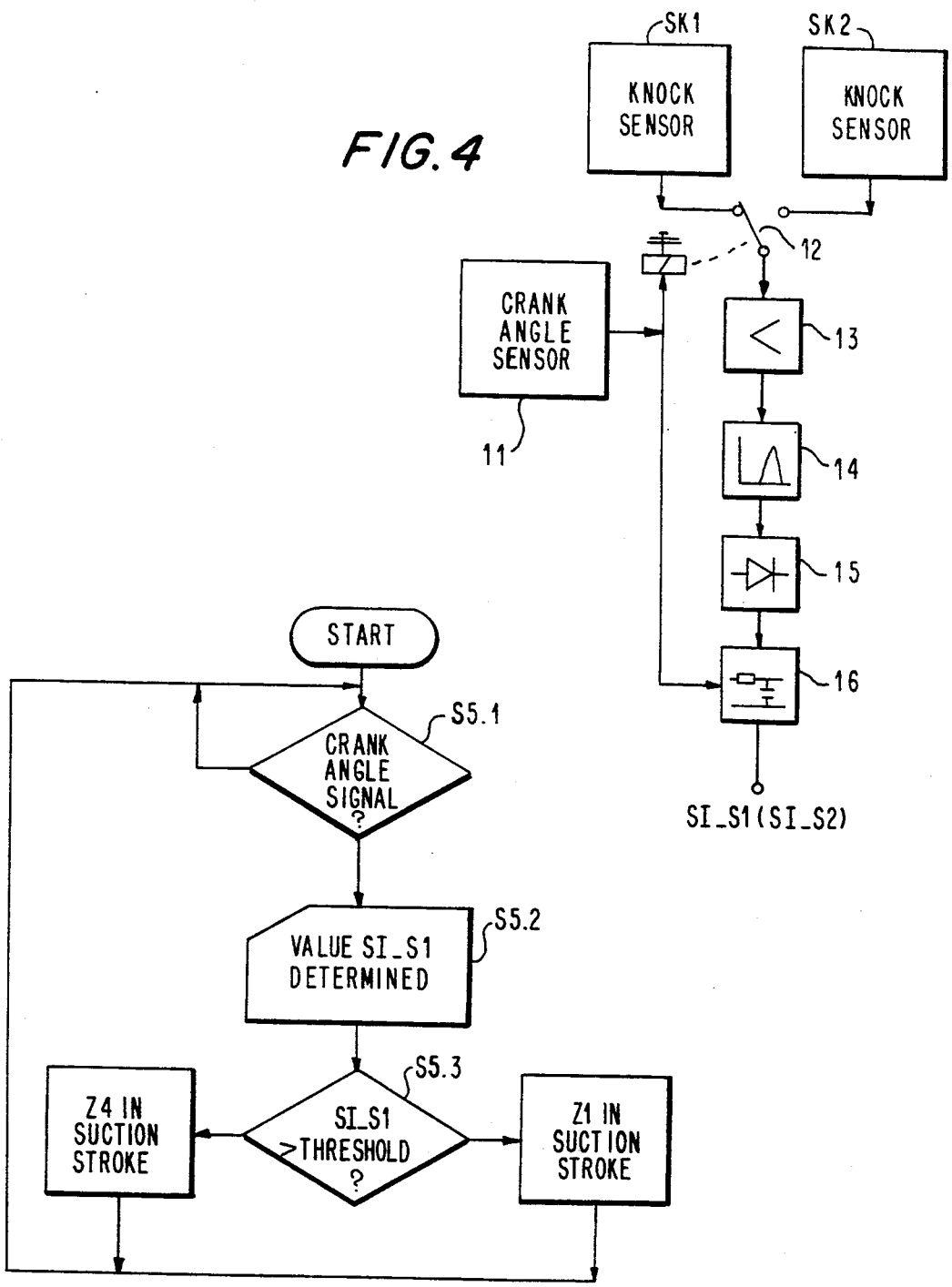

METHOD FOR RECOGNIZING THE POWER STROKE OF A FOUR-STROKE ENGINE

This is a continuation of application Ser. No. 07/768,310, filed Sep. 26, 1991, now abandoned.

BACKGROUND OF THE INVENTION

The invention is directed to a method for recognition of the respective power stroke of the cylinders of a fourstroke engine the four strokes of such an engine being designated as intake stroke, compression stroke, combustion stroke and exhaust stroke.

In electronic control processes employed in such engines, it is important for various signals to recognize the power stroke of every cylinder with precision. For example, in electronic ignition with individual sparking coils, it must be accurately known when a piston is located at a predetermined crank angle differential prior to the top dead center of the combustion stroke.

Two methods are, known in particular for cylinder recognition. One method makes use of the signals of an ignition distributor. An inductive sensor is arranged at an ignition cable, which inductive sensor delivers a signal at every 720° crank angle, since an ignition signal is supplied to the respective cylinder at all 720° crank angles. The power stroke of the monitored cylinder is exactly associated with the occurrence of this sensor signal. If the power stroke of this one cylinder is known, the respective power strokes in which the other cylinders are located is also determinable.

The other method, which is known e.g. from EP 0 058 562, makes use of signals of a camshaft sensor. The camshaft rotates only once during two revolutions of the crankshaft, so that a sensor signal is sent after every 720° revolution of the crankshaft. The power strokes of the individual cylinders are substantially associated with the occurrence of this sensor signal based on the engine construction.

In automobile electronics, it is desirable, in principle, to obtain a desired amount of information with as few sensors as possible. Accordingly, efforts have been made for a long time to develop power stroke recognition in four-stroke engines in such a way that no special sensors are required such as the aforementioned inductive sensor at an ignition cable or the camshaft sensor.

A method for the recognition of the power stroke of a cylinder of an internal combustion engine is known from WO 87/05 971, in which method a quantity modulated in the power stroke, e.g. rate of rotation or pressure in the combustion chamber, is related to the signal of a crankshaft sensor which generates one reference pulse per revolution. The occurrence of a reference pulse and a maximum of the modulated signal enables an unequivocal recognition of the power stroke in an internal combustion engine with an uneven number of cylinders.

However, the known method has the disadvantage that it cannot be used with an internal combustion engine having even number of cylinders.

SUMMARY OF THE INVENTION

The object of the invention is to provide a new method for recognizing a power stroke of each cylinder in a four-stroke engine. The method of the invention comprises the steps of sensing a parameter of a cylinder in said engine for producing a signal of said parameter, said parameter being selected from the group consisting of pressure and knocking, and comparing said signal with a threshold value for determining whether said signal exceeds said threshold value and thereby is indicative of said cylinder being in a corresponding stroke.

In particular two types of sensor are considered for use as combustion cycle sensors, namely pressure sensors which monitor the pressure in the interior of a cylinder and knock sensors which measure structureborne sound vibrations of the engine block in order to make deductions about combustion knocking from excessively large signals within a predetermined crank angle area.

If an engine comprises pressure sensors, such a pressure sensor is arranged in every cylinder in order to monitor and accordingly influence the combustion cycle in every individual cylinder. However, it is sufficient for cylinder recognition to detect the signal of one of these sensors. At every 720° crank angle a particularly high signal occurs at every sensor, which is when the cylinder pressure reaches its maximum. If the level of the signal of a pressure sensor is compared with a threshold value which is only exceeded during the combustion process, the power stroke of the monitored cylinder, and accordingly the respective stroke of the other cylinders, is fixed when the level is exceeded.

If corresponding comparisons like those just described are carried out for all pressure sensors, cylinder recognition is possible not only at every 720° crank angle, but at all 720/n° crank angles, wherein n is the number of cylinders of the four-stroke engine. An even faster cylinder recognition is possible when, in addition to a comparison with a threshold value, the curve of the signal of at least one pressure sensor is monitored in a predetermined crank angle area. The power stroke of the monitored cylinder can be deduced from the curve of the signal, that is, from the extent of the increase or decrease in the level of the signal.

If knock sensors are used, their signal is advantageously evaluated over a respective crank angle range within which it is known that the monitored engine produces particularly loud noises which also occur when the engine does not knock. These are noises such as those which occur particularly when a cam strikes a valve disk, when a valve strikes its seat or when a piston tilts. All three types of noise occur in an area around the top dead center position of a piston between the end of the exhaust stroke and he beginning of the intake stroke. Such noises are determined for every individual cylinder with different intensity by two sensors which are arranged at different locations on an engine block. Thus, the cylinder from which the noises originate is known. If the noises of a predetermined cylinder exceed a threshold value it is known that this cylinder has just passed through that crank angle area in which the particularly loud noises occur. Accordingly, the power stroke or gas exchange stroke of this cylinder is known.

It is also possible for every cylinder to be assigned its own knock sensor and to recognize the power stroke of one cylinder, and accordingly also of the other cylinders, when the output signal of the respective cylinder exceeds a threshold value.

The present invention both as to its construction and its method of operation, together with additional objects and advantages thereof, will be best understood from the following description of preferred embodiments when read in connection with the accompanying drawings.

BRIEF DESCRIPTION OF THE DRAWINGS

FIG. 1 shows a schematic view of an engine block with four cylinders, with a pressure sensor per cylinder and with a crank angle sensor;

FIG. 2 shows a flow chart for a method flow, in which the signals of combustion sensors are used for recognizing the power stroke, wherein the combustion sensors are pressure sensors;

FIG. 3 shows a view corresponding to that of FIG. 1, wherein two knock sensors all used instead of four pressure sensors;

FIG. 4 shows a block wiring diagram of a circuit for evaluating the signals of knock sensors;

FIG. 5 shows a flow chart for a method which uses signals of knock sensors for recognizing the power strokes of cylinders;

DETAILED DESCRIPTION OF THE PREFERRED EMBODIMENTS

Figure 6:
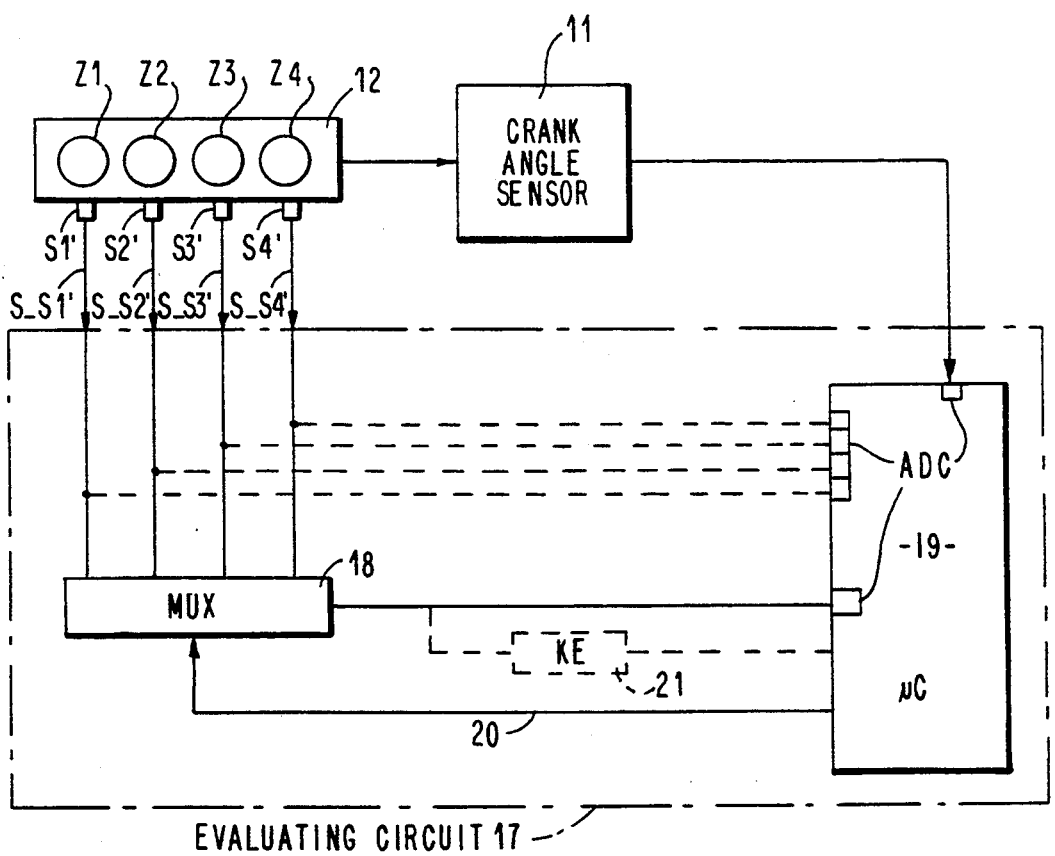
FIG. 6 is a schematic view of an engine block with four cylinders, with a knock sensor per cylinder and with a crankshaft sensor, the connections between the knock sensor and the control device also being shown.

First, it is noted that the arrangements according to FIGS. 1, 3 and 4 are known. These arrangements are used in a new and additional manner, examples of which are given in the flow charts of FIGS. 2 and 5.

In the schematic view of an engine block 12, according to FIG. 1, four cylinders Z1-Z4 are shown as circles. A pressure sensor is arranged in every cylinder. These pressure sensors are designated by S1-S4. They send signals $S\_1$-$S\_4$. Every signal reaches a maximum approximately at the top dead center position of the respective cylinder. When the respective crank angle is reached, it can be determined by a crank angle sensor 11.

In the method illustrated by FIG. 2, it is determined in a step s1 whether or not the crank angle has reached one of two predetermined values until this is the case. The two predetermined values are crank angle values in which there is a possibility of maximum combustion pressure for two of the cylinders, e.g. for cylinders Z1 and Z4, in an ignition sequence Z1-Z3-Z4-Z2. The four signals $S\_1$-$S\_4$ are determined in a subsequent step s2 and a check is made in subsequent steps as to which of the four signals has exceeded a predetermined threshold value. That signal which lies above the threshold value indicates that the respective cylinder is located in the combustion stroke. Accordingly, the power strokes of the other cylinders are also determined.

The method according to FIG. 2 can be easily modified in various ways. Thus, all four signals need not be determined in step s2, rather it is sufficient to determine those two signals for which there is a possibility of exceeding the threshold value based on the crank angle. For example, these might be signals $S\_2$ and $S\_3$. Both signals can then be checked with respect to whether or not the threshold value has been exceeded. However, it is sufficient to check only one signal, e.g. the signal $S\_2$. If this exceeds the threshold value, it is determined that the cylinder Z2 is located in the combustion stroke. If it remains below the threshold value, it is determined that cylinder Z3 is in the combustion stroke.

The variants mentioned thus far enable a power stroke recognition at all 180° crank angles. If measurement values are determined only at a single predetermined crank angle, a power stroke recognition is possible at every 360° crank angle. If the signal of only one pressure sensor is used, there is a possibility for recognition at all 720° crank angles.

In the embodiment example illustrated by FIG. 2, the signals of the pressure sensors S1-S4 are compared only with a threshold value. If, instead of this, the curve of at least one of the signals is evaluated over a predetermined crank angle area, a power stroke recognition is possible already after a crank shaft revolution of less than 180°.

The embodiment example according to FIGS. 3-5 works with knock sensors instead of with pressure sensors.

FIG. 3 in turn shows a cylinder block 10 with four cylinders Z1'-Z4' arranged in series. A first knock sensor SK1 is arranged at the engine block between the cylinders Z1' and Z2', while a second knock sensor SK2 is arranged between the cylinders Z3' and Z4'. The distance between the first knock sensor SK1 and the first cylinder Z1' in the longitudinal direction of the engine is designated by a. The distance from cylinder Z4' is then 5a. There is also a distance a' from cylinder Z2', and a distance 3a from cylinder Z3'. In an ignition sequence Z1'-Z3'-Z4'-Z2', the pistons of cylinders Z1' and Z4' may be located in the top dead center position at a crank angle of 0°. The pistons of cylinders Z2' and Z3' are then located in the top dead center position at a crank angle of 180°. However, two cylinders in the top dead center position run in different power strokes, for which reason the recognition of the crank angle alone is not sufficient for determining the power stroke.

It is assumed that there is an engine in which every cylinder produces particularly loud noises in the area of the top dead center during the transition from the exhaust stroke to the intake stroke, namely due to the cam striking the tappet of the opening valve, due to the tilting of the piston when passing through the top dead center point, and finally due to the disk of the outlet valve striking its seat. This stroke time period is designated in the following as crossover stroke. When cylinder Z1 passes through its crossover stroke, the noises produced thereby are detected by the first knock sensor SK1 considerably more sharply than when the corresponding noises are made by cylinder Z4'. The sound intensity decreases approximately by the square of the distance of the cylinder from the knock sensor, so that the intensities are in an approximate ratio of 25:1 relative to one another. The signals of cylinders Z1' and Z3' have an approximate ratio of 9:1. A particularly sure recognition of the power stroke is thus possible when signals are determined at a crank angle in which the pistons of cylinders Z1' and Z4' are in the top dead center position. If loud noises are measured by the knock sensor SK1, this is a sign that cylinder Z1' is running in the crossover stroke. Otherwise, cylinder Z4' runs in the crossover stroke. There is a crank angle sensor 11' for recognition of the crank angle.

As already discussed, particularly loud engine noises occur as a rule within a predetermined crank angle area. Therefore, it is recommended that signals of the knock sensors be determined not only at a predetermined crank angle, but that integrated signals be used. In order to integrate the signals of knock sensors, a circuit is generally used, which is illustrated by FIG. 4. According to this, the signals of the two knock sensors SK1 and SK2 are sent, as desired, via a reversing switch 5, to an amplifier 13, a subsequent band-pass filter 14, a rectifier 15 and an analog integrator 16. The reversing switch 5 is switched by means of a signal of the crankshaft sensor 11'. The signal also resets the integrator 16 with every switching. An integration signal SI_S1 or SI_S2 occurs at the output of the integrator 16 for some time after its resetting, depending on which knock sensor has just been switched.

A method which can be implemented by means of the arrangements according to FIGS. 3 and 4 is illustrated by the flow chart of FIG. 5. In a step s5.1, a check is made as to whether or not the crank angle has reached a predetermined value after the top dead center position of cylinders Z1' and Z4'. If this is the case, the integration value SI_S1 is determined by the first knock sensor SK1 in a step s5.2. The determined value is compared with a threshold value S_TH (step s5.3). If the threshold value is exceeded, this indicates that cylinder Z1' is located in the intake stroke. Otherwise, the cylinder Z4' is located in the intake stroke.

In the method illustrated by FIG. 5, only the signal of the first knock sensor SK1 is used. As illustrated by FIG. 4, however, the signal SI_S2 of the second knock sensor SK2 is also available. This signal can be utilized in order to ensure the measurement results. It is not sufficient as a condition for power stroke recognition that the signal of a knock sensor exceeds a threshold value, rather the additional condition, that the signal of the other knock sensor remains below the threshold value, must be fulfilled. If both signals exceed the threshold value or remain below it, the recognition test will be rejected as unsuccessful.

If measurements are taken only at a predetermined crank angle, cylinder recognition is possible at every 360°. On the other hand, if the measurement values of at least one of the two knock sensors are determined every 180° it is also possible to recognize the power stroke every 180°. Of course, the signals of the cylinders Z2' and Z3' must be distinguished with respect to which signals differ from one another in intensity less than the signals of cylinders Z1' and Z4', which is why this recognition is susceptible to disturbance.

In all cases of evaluation of the signals of knock sensors, it is strongly recommended to evaluate those engine noises which occur in an angular area different from that in which knocking can occur in order not to falsify the power stroke recognition as a result of possibly occurring knock signals.

For the purpose of knock recognition, the reversing switch 5 of the circuit according to FIG. 4 is conventionally actuated in such a way that the signal is acquired from the knock sensor lying closest precisely to the cylinder in which knocking can occur. In an ignition sequence Z1'-Z3'-Z4'-Z2', the switching sequence is accordingly SK1-SK2-SK2-SK1. If a cylinder recognition is to be carried out rapidly, securely and simply in the case of starting an engine, it is recommended to diverge from this switching sequence, namely to switch repeatedly to only one of the two knock sensors until the stroke recognition has been successful. The reason why this is advisable can be seen from the method flow discussed with reference to FIG. 5.

An engine block 12 is shown schematically in FIG. 6 corresponding to the view in FIG. 1, a knock sensor S1'-S4' is assigned to each of the four cylinders Z1-Z4. The knock sensors S1'-S4' deliver signals S_S1'-S_S4' which can be assigned to a cylinder and are at a maximum when the respective cylinder produces particularly loud noises in the area of the top dead center point in the transition from the exhaust stroke to the intake stroke.

Figure 7:
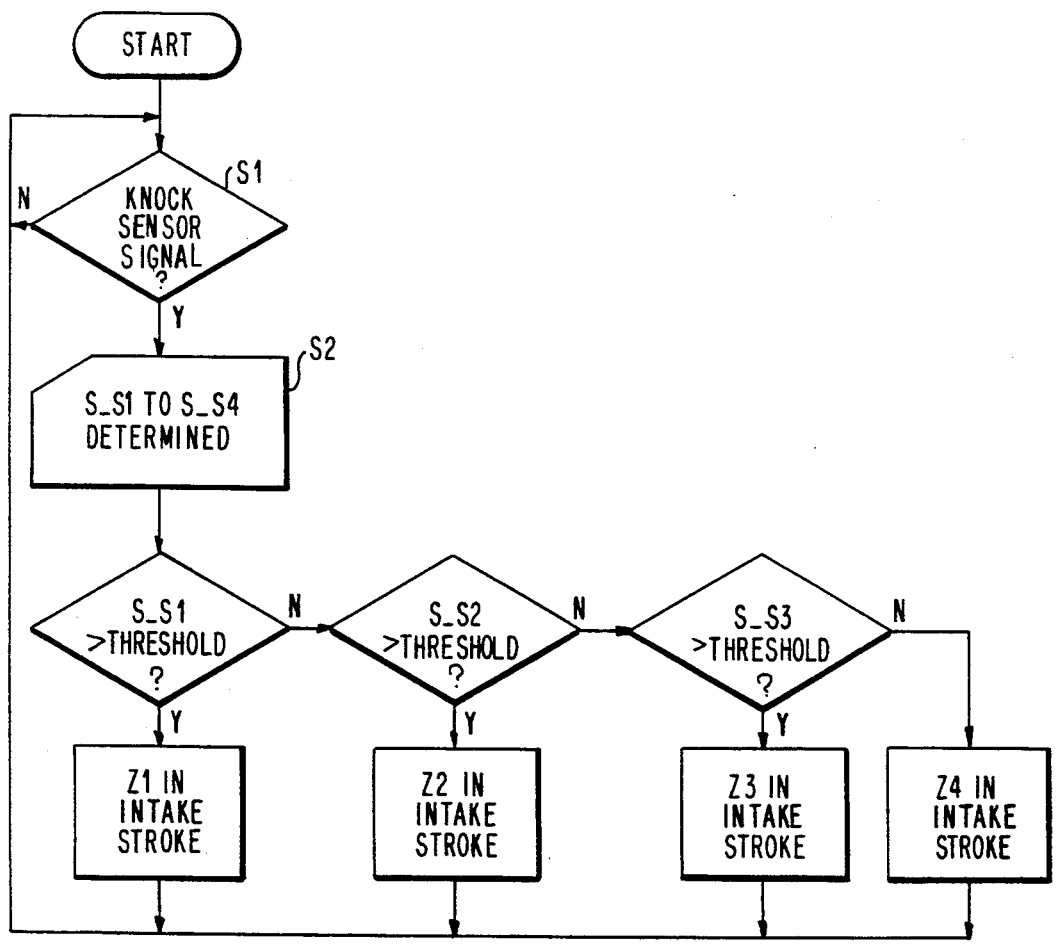
FIG. 7 shows a flow chart corresponding to FIG. 2 with knock sensors as combustion sensors.

In the method shown in FIG. 7, and therefore not discussed further, corresponding to the procedure according to FIG. 2, the power stroke in which the respective cylinder is located is recognized from the exceeding of a predetermined threshold value; in contrast to the method according to FIG. 2 which is directed to the evaluation of pressure sensor signals, it is recognized in the evaluation of knock sensor signals from the exceeding of the threshold value that the cylinder in question is located in the intake stroke.

The arrangement shown in FIG. 6 is a possible construction of the evaluating circuit which can be used, moreover, in a corresponding manner also for the arrangements according to FIGS. 1 or 4.

The evaluating circuit 17 comprises a multiplexer 18 as well as a $\mu C$ 19 which is, e.g. a component part of a control device, not shown.

The knock sensors S1'-S4' are either connected, via a line, with the multiplexer 18 and, via the latter by another line, with the analog-to-digital converter ADC of the $\mu C$ 19 via another line, but they can also be connected directly with the $\mu C$ 19 via four ADCs.

In the first case, a processing takes place in the multiplexing operation; in the Second case, the signals are processed in the parallel operation. The multiplexer 18 is controlled by means of the $\mu C$ 19 via the line 20.

For normal knock recognition, an arrangement 21 is provided in which this knock recognition is effected in a conventional manner.

Of course, the procedures indicated in the description of the evaluation of the knock signals corresponding to the arrangement according to FIG. 3, such as integration of the signals and comparison of the integral value with a threshold value, can also be realized with the arrangement according to FIG. 6.

The embodiment examples concern power stroke recognition in a four-cylinder four-stroke engine. In an engine with more than four cylinders, the method is effected in a corresponding manner. In engines having more than six cylinders, cylinder noises can be associated with individual cylinders in a very reliable way, since such engines as a rule comprise two banks of cylinders and always only one piston is located in the top dead center position in every bank respectively.

The discussed methods show how combustion cycle sensors can have an additional use, namely that of recognizing the respective power stroke of a cylinder. The more signals of individual sensors utilized, the quicker and/or more reliable the power stroke recognition. This is particularly advantageous when starting the engine.

While the invention has been illustrated and described as embodied in a method of recognizing the power stroke of a four-stroke engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for recognizing a stroke of a cylinder in a four-stroke engine, the method comprising the steps of: obtaining a sensor signal of at least one knocking sensor associated with a cylinder at a predetermined crank shaft angle; comparing said sensor signal with a threshold value so as to determine that said cylinder is in a stroke in which high noise intensity is produced and thereby other cylinders of the engine are in corresponding strokes; selecting a height of said threshold so that exceeding of said threshold can be obtained only during a phase with high noise intensity, and when said threshold value is exceeded by said sensor signal it can be determined that said cylinder is in its intake stroke.

2. The method according to claim 1, wherein said sensing includes receiving sound waves of different intensities from said knocking for producing a signal of sound waves for each cylinder, each cylinder being in said intake stroke, respectively, when said signal of sound waves corresponding to a respective cylinder exceed a threshold value.

3. The method according to claim 1, wherein said intake stroke occurs for each cylinder, respectively, when said sensor signal of a respective cylinder exceeds said threshold value and said sensor signal of another respective cylinder does not exceed said threshold value.

4. The method according to claim 1; further including the step of supplying said sensor signal to an evaluating circuit by a signal line employed in a multiplexer processing operation.

5. The method according to claim 1, wherein said obtaining includes obtaining sensor signals of a plurality of knocking sensors associated with a plurality of cylinders; further including the step of supplying said sensor signals to an evaluating circuit by a plurality of signal lines employed in a parallel processing operation.

6. A method for recognizing a stroke of a cylinder in a four-stroke engine, the method comprising the steps of: obtaining a sensor signal of at least one knocking sensor associated with a cylinder; evaluating said sensor signal at a predetermined crank shaft angle; comparing said sensor signal with a threshold value so as to determine that said cylinder is in a stroke in which high noise intensity is produced and thereby other cylinders of the engine are in corresponding strokes; selecting a height of said threshold so that exceeding of said threshold can be obtained only during a phase with high noise intensity, and when said threshold value is exceeded by said sensor signal it can be recognized that said cylinder is in its intake stroke.

* * * * *